United States Patent [19]
Fischer

[11] Patent Number: 5,777,058
[45] Date of Patent: Jul. 7, 1998

[54] METALLO-OXOMERIC SCRUBBER COMPOSITIONS

[75] Inventor: H. Eric Fischer, Monsey, N.Y.

[73] Assignee: ATMI Ecosys Corporation, San Jose, Calif.

[21] Appl. No.: 654,780

[22] Filed: May 29, 1996

Related U.S. Application Data

[63] Continuation of Ser. No. 179,441, Jan. 10, 1994, abandoned.

[51] Int. Cl.$^6$ .................................................. C01G 67/00
[52] U.S. Cl. .......................... 528/9; 528/27; 528/395; 556/49; 556/55; 556/62; 423/326; 423/519.2; 423/419.1; 423/210; 502/401; 502/406
[58] Field of Search .............................. 423/210, 419.1, 423/240 S, 326, 519.2; 502/401, 406, 512, 405; 528/395, 271, 381, 388, 9; 556/114, 131, 55, 62, 49, 147

[56] References Cited

U.S. PATENT DOCUMENTS

| | | | |
|---|---|---|---|
| 2,174,177 | 9/1939 | Kraybill et al. | 502/405 |
| 3,197,436 | 7/1965 | Block et al. | 528/9 |
| 3,416,883 | 12/1968 | Gould | 423/419.1 |
| 3,664,352 | 5/1972 | Norman et al. | 502/406 |
| 4,113,652 | 9/1978 | Yoshikawa et al. | 502/406 |
| 4,284,528 | 8/1981 | Lancet et al. | 423/230 |
| 4,299,719 | 11/1981 | Aoki et al. | 423/231 |
| 4,535,072 | 8/1985 | Kitayama et al. | 502/411 |
| 4,594,231 | 6/1986 | Nishino et al. | 423/241 |
| 4,657,752 | 4/1987 | Lyon | 423/419.1 |
| 4,670,288 | 6/1987 | Ikari et al. | 427/4 |
| 4,729,889 | 3/1988 | Flytani-Stephanopoulos et al. | 423/593 |
| 5,037,624 | 8/1991 | Tom et al. | 423/210 |
| 5,143,706 | 9/1992 | Schubert | 423/230 |
| 5,151,395 | 9/1992 | Tom | 502/67 |

FOREIGN PATENT DOCUMENTS

| | | | |
|---|---|---|---|
| 8903952 | 2/1991 | Brazil. | |
| 303368 | 2/1989 | European Pat. Off. | 423/240 S |
| 457457 | 11/1991 | European Pat. Off. | 502/401 |
| 54-99794 | 8/1979 | Japan | 502/406 |
| 61-074629 | 4/1986 | Japan. | |
| 61-74629 | 4/1986 | Japan | 502/406 |
| 61-074629 | 11/1986 | Japan. | |
| 62-139662 | 6/1987 | Japan. | |
| 62-298362 | 12/1987 | Japan. | |
| 4-161224 | 6/1992 | Japan | 423/240 S |
| 674780 | 7/1979 | U.S.S.R. | 502/406 |
| 835751 | 5/1960 | United Kingdom. | |
| 8501512 | 4/1985 | WIPO. | |

OTHER PUBLICATIONS

Brown, D.B. et al., "Magnetic Properties and Möessbauer Spectra of Several Iron(III)-Dicarboxylic Acid Complexes"; Inorganic Chemistry, 1981, pp. 671-678, see pp. 671-672 and 678 and Figure 1.

Hueckel, W., Structural Chemistry of Inorganic Compounds, 1952, pp. 663-665, see p. 664 and Fig. 104.

"Waste gas analysis and disposal for dry etching and chemical vapor deposition processes" Rufin et al., 1988 Proc. I.E.S., pp. 494-501.

"Selection criteria for hazardous waste disposal," Hamilton, R.E., Solid State Technol., Jul. 1989, pp. 95-96.

"Semiconductor wafer fabrication industry takes the lead in pollution abatement technology" Elder et al., SSA Journal, Jan. 1991, pp. 34-38.

"Dry etch chemical safety," J. Ohlson, Solid State Technology, Jul. 1986, pp. 69-73.

"Toxisorb-safe disposal of spent proces gases," Messer-–Griesheim GmbH 1990.

"Insertion of carbon dioxide into the Ni-R bond . . . " Yamamoto et al., Chem. Lett. 1978, pp. 615-616.

Infrared Spectra of Inorganic Compounds (3800-45 cm$^{-1}$) R.A. Nyquist & R.O. Kagel, Academic Press, NY. 1971, pp. 7, 14, 15.

"Insertion reactions of carbon dioxide and carbon disulfide . . . " J. Organometal. Chem. 113 (1976), pp. 187-200.

"Ambivalentes verhalten von tetrakis (trimethylphosphin)eisen . . . " Chem. Berichte. 110 (1977), pp. 2213-2221.

Brown, D.B., et al. "Magnetic Properties and Mossbauer Spectra of Several Iron (III)-Dicarboxylic Acid Complexes", in Inorganic Chemistry, vol. 20, pp. 671-678 (1981).

Huckel, W., "Structural Chemistry of Inorganic Compounds", vol. II., Amsterdam: Elsevier Publishing Co., 1951, pp. 663-665.

Goodall, D.C., et al. "Studies in Metal Sulfite Chemistry-III", Polyhedron, vol. 2, #3, pp. 153-156 (1983).

Chemical Abstracts, vol. 115, #113, 274d: "Iron(II) compositons useful as deodorants . . . " (1991).

Chem. Abs., vol. 103, #92,659t: "Chemically Active Composition Containing Ferrous Ion". (1985).

Chem. Abs., vol. 109, #134,380b: "Air Deodorants Containing Stabilized Ferrous Compounds" (1987).

Chem. Abs., vol. 107, #182,644w: "Granular Deodorants" (1987).

Kirk-Othmer, eds. "Encyclopedia of Chemical Technology", 3rd edition, vol. 13, pp. 764-765.

*Primary Examiner*—Steven Bos
*Assistant Examiner*—Peter DiMauro
*Attorney, Agent, or Firm*—Steven J. Hultquist; Oliver A.M. Zitzmann

[57] ABSTRACT

Scavengers for removing acidic or corrosive gaseous components from semiconductor process effluents comprising a metallic macromer comprising a coordinated complex of (i) metal coordination atoms linked to (ii) oxomeric moieties selected from the group consisting of carbonate, sulfite, carboxylate, and silicate, and methods for synthesizing these scavengers. A method for cleaning an exhaust gas containing least one corrosive or acidic gaseous component selected from the group consisting of hydrogen halide, chlorine, boron trihalide, thionyl chloride, and tungsten hexafluoride, which comprises contacting the exhaust gas with the metallic macromer scavenger compositions.

29 Claims, 1 Drawing Sheet

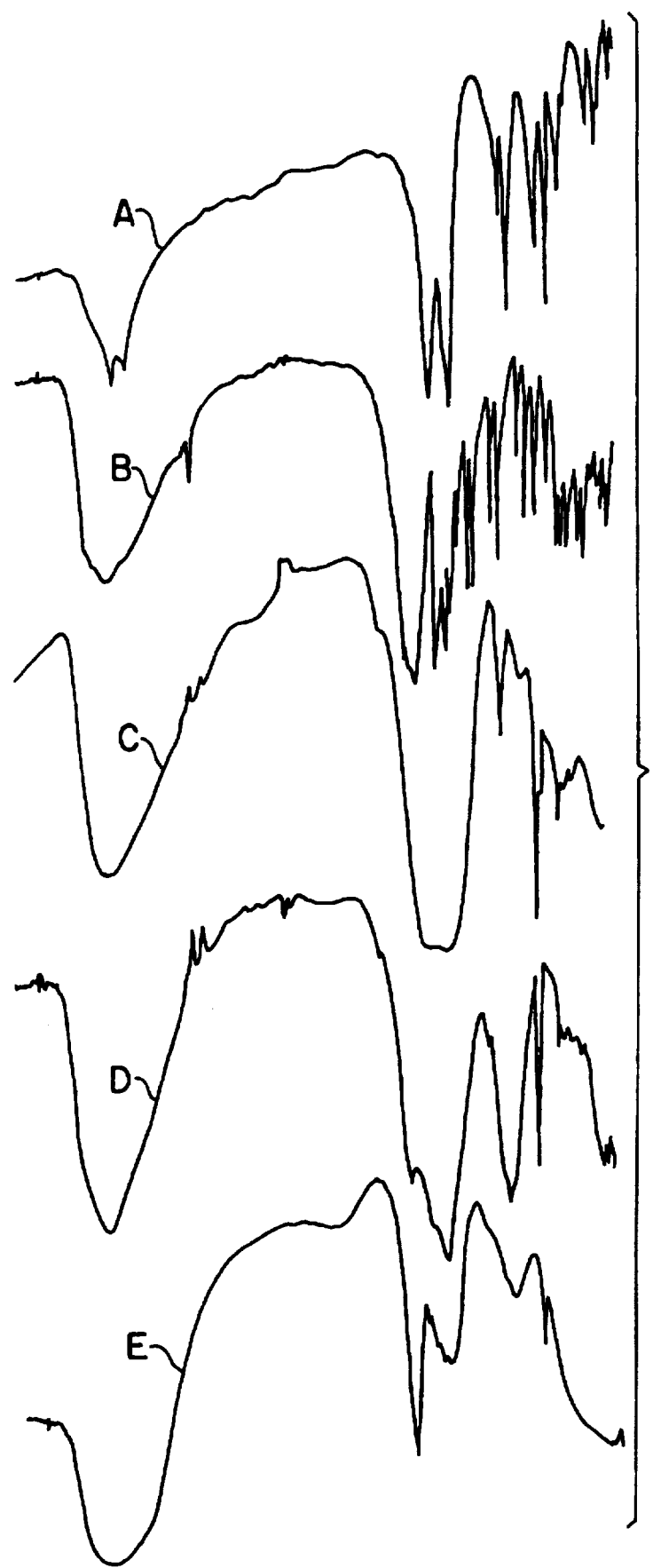
FIGURE

5,777,058

METALLO-OXOMERIC SCRUBBER COMPOSITIONS

This is a continuation of U.S. application No. 08/179,441 filed Jan. 1, 1994, now abandoned.

BACKGROUND OF THE INVENTION

1. Field of the Invention

This invention relates to a scavenger composition for removing from a gas stream acidic and/or corrosive gases including mineral acids such as hydrogen chloride, hydrolyzable metal halides such as boron trichloride, tungsten hexafluoride or halosilanes, reducible organic compounds such as phosgene, hydrolyzable inorganic compounds such as thionyl chloride, and halogens. The present invention further relates to a process of removing such compounds from gas streams with the same scavenger. In yet a further aspect, the present invention relates to a method for synthesizing the scavengers.

2. Description of the Related Art

In the manufacture of semiconducting materials and semiconducting devices, a wide variety of hazardous gases are employed or produced. Some acidic or corrosive gases are employed in cleaning semiconductor manufacturing equipment such as reactor tubes and susceptors, and/or as etchants for the manufacture of microcircuitry devices.

Dry etching processes used to create patterned metal layers on wafers in the production of VLSI devices produce gaseous waste streams which contain halogens and halogenated moieties. A common example of this type of etching is the formation of contact patterns in an aluminum layer. Contact patterns are produced by masking off portions of a metal layer and then removing the unwanted exposed metal.

To remove aluminum not covered by a mask, chlorine and/or chlorinated moieties in the gas phase are passed through a chamber containing the masked wafers. The gas or gas mixture is then subjected to radio frequency to produce a plasma which will react with the exposed metal and/or its oxide coating. In reacting with the metal and/or its oxide coating, volatile compounds are formed, which vaporize from the surface of the wafer and pass out of the chamber with the other process gases. In aluminum etching $CCl_4$, $BCl_3$, $Cl_2$, $SiCl_4$, $BBr_3$, and mixtures of these, sometimes in conjunction with oxygen, are typically employed as etch reagents.

The waste streams from etch process chambers contain a large percentage of the inlet gas which passes through the chamber unreacted as well as reactive fragments arising from partial decomposition of a portion of the inlet gas, metal halides characteristic of the metal being etched and mineral acid typical of the halogen moiety employed in the process (e.g. HCl in the case of chlorinated etch moieties). Many of the compounds in the waste gas from an etch tool will react with water to produce an oxide and mineral acid, for example,

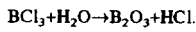

The effluent constituents are hazardous, frequently toxic, and corrosive to equipment, especially in the presence of water (such as atmospheric moisture).

Materials other than aluminum are etched in a similar fashion, and in some cases reagents containing other halogen moieties such as fluorine or bromine instead of chlorine are employed. For example, reactive ion etching is used to pattern $SiO_2$ wafers. Silicon dioxide thin films are superior dielectric insulators and masking materials for manufacturing MOS devices. For etching $SiO_2$ over silicon, fluorocarbon and hydrocarbon gas mixtures are used. In the effluent from the plasma chamber, many by-products are added to the original etching gases. Rufin and Hirase analyzed effluent streams and reported that the most hazardous constituents of the effluent were HF, $COF_2$, $SiF_4$ and CO (Rufin, D., Hirase, I., 1988 Proceedings, Institute of Environmental Sciences, pp. 494–501).

Another semiconductor fabrication process that generates acidic waste gas streams is deposition of tungsten interconnects by CVD using the process

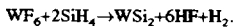

Rufin and Hirase also reported on the composition of effluent from this processes. Hazardous waste gases included $WF_6$, HF, $WOF_4$, $SiF_4$ and other unidentified species were detected.

To summarize, many semiconductor processes generate hazardous acidic gas streams which must be scrubbed to provide an effluent stream that does not contain any hazardous species in concentrations which are dangerous to personnel or equipment. The "Threshold Limit Value" or TLV (American Conference of Governmental Industrial Hygienists: "Threshold Limit Values and Biological Exposure Indices," 1987, Cincinnati, Ohio) and analogous "Permissible Exposure Limit" or PEL (U.S. Department of Labor, Occupational Safety and Health Administration: 29 CFR 1910.1000) are concentrations of gases in workplace air, below which it is believed that routine exposure over a normal workday poses no risk of harm to personnel. These concentrations provide good benchmarks for effluent gas scrubbing. An adequate scrubber should remove hazardous gas components from the effluent gas stream to concentrations below the TLV or PEL. TLV's for some representative corrosive or toxic species that may be found in semiconductor processing effluents are given below in parts per million:

| Gas | Formula | TLV (ppm) | Gas | Formula | TLV (ppm) |
|---|---|---|---|---|---|
| boron trifluoride | $BF_3$ | 1 | boron trichloride | $BCl_3$ | 5 (HCl) |
| boron tribromide | $BBr_3$ | 1 | carbonyl fluoride | $COF_2$ | 2 |
| phosgene | $COCl_2$ | 0.1 | hydrogen bromide | HBr | 3 |
| hydrogen chloride | HCl | 5 | hydrogen fluoride | HF | 3 |
| chlorine | $Cl_2$ | 0.5 | silicon tetrafluoride | $SiF_4$ | — |

Several methods have been employed to abate these hazardous effluents. Among methods commonly used are dissolution and reaction of the hazardous species in water or an aqueous solution containing a species with which the hazardous moieties react (water scrubbing), adsorption of the hazardous species by material such as activated carbon, and reaction of the hazardous species in a heterogeneous reactor (Hamilton, R. E.; Solid State Technology, July 1989, pp 95–96; Elder, D., Krummen, R. S., SSA Journal, January, 1991, pp. 34–38. Applications Notes: Solid State Technology, May, 1990, p 93).

Water scrubbers require constant maintenance, and if the gaseous effluent contains highly flammable compounds such as silane (which is not soluble in water but reacts readily with oxygen), they present an explosion hazard. Adsorption systems such as zeolites only delay the disposal of the hazardous material, and when saturated the adsorbent acts as a source of the hazardous material it was being used to abate. Systems which carry out heterogeneous (gas/solid) chemistry with the hazardous moieties (gas/solid heterogeneous reactors) are gaining acceptance as the preferred method of abating many types of hazardous gas waste streams, including etch gas effluent streams. In general such "dry scrubber" reactors irreversibly immobilize the hazardous moieties within the reactor's chemically active scavenger bed. In some cases the hazardous moiety is reacted to yield a product which is non-hazardous, simplifying disposal of the spent scavenger.

Although it is not universally the case among commercially offered units, gas/solid heterogeneous reactors (chemical scrubbers) can be designed to function without additional reagents or energy supplied to them during their lifetime. This passive, ambient condition operation has the advantage that the scrubber operates on an "as needed" basis, continues to scrub even in the absence of external power, and requires very little maintenance. Additionally, because they are designed to be used with a single process tool and generally require little in the way of utilities, they can be used in close proximity to the source of the hazardous effluent. The risk of exposure to personnel and physical plant is reduced by minimizing the amount of interconnecting piping between the hazard source and the abatement device.

One of the shortcomings of passive, ambient temperature, stoichiometric heterogeneous scrubber technology has been low volumetric efficiency. As an example, a commercially available room temperature stoichiometric reactor for abatement of hazard gases (Messer Griesheim Industries "Toxisorb") has a capacity of only 0.6 moles/liter of scavenger bed for $BCl_3$ and 0.33 moles/liter for HCl. Volumetric efficiency is related to the amount of hazardous gas which may be consumed by a given volume of reactive mass. In stoichiometric, heterogeneous scrubbers, volumetric efficiency is composed of two terms, (1) the maximum amount of reactive species within the scrubber media which is accessible for reaction with the hazard species contacting it, and (2) the rate at which the reactive species in the scrubber media can chemically react with the contacting hazardous species.

The first factor, the maximum amount of reactive species within the scrubber media which is accessible, can be limited because the active scavenger is actually present as a fairly low percentage of the scrubber media. In many cases the active scavenging species is infused or adsorbed onto an inert support material, whose function is to provide a high surface area and the physical stability needed to maintain good flow rates of the effluent gas being scrubbed. The packing efficiency and the volume of the inert support will reduce the amount of the reactive species which can be contained within a given volume of the scrubber media. This problem could be remedied by constituting the scrubber media of only reactive species and packing the reactor solid with the scrubber media, but even such a strategy did not block flow of the effluent gas stream, maximum capacity could be achieved only if the hazardous components had access to the reactive species lying within the mass of the scrubber media.

If only the surface or upper few atomic layers of the reactive scavenger species reacts with the hazardous material (i.e., the reactive mass is non-ablative under the conditions in which it is being used, which is usually the case in ambient temperature systems), the capacity will be limited by the surface area of the reactive mass within a given volume of the reactor. As the surface area of the reactive mass is increased the "concentration" of reactive species within a given volume of the reactor is reduced by the amount of reactor volume consumed in void volume. In addition, the scrubber media must have sufficient mechanical strength to resist fracture and compression during handling and in use, so that the gas flow will not become clogged by dust or the collapsed pore volume of the solid. This implies that in the case of homogeneous, porous reactive masses, additional reactor volume will be lost to material which is either inaccessible or inert to the hazardous components of the gas stream contacting the scrubber media. Such scrubber media will require frequent replacement so that the scrubber media container may be maintained at a size consistent with its use.

The rate of reaction between the active scavenger and the hazardous gas stream components imparts a flow rate dependence to the capacity of a given volume of scrubber media. If a given volume of a gas stream is swept through a given volume of the reactor at a rate much slower than the rate at which the hazardous components of the stream react with the scrubber media, the capacity of the scrubber media will approach the value possible based upon the quantity of reactive mass which is contained and accessible to the gas stream within that volume of the reactor. As the flow rate is increased, decreasing amounts of the hazardous component will react with the scrubber media while it resides within that volume of the reactor, and the remainder will be swept along with the innocuous gases to react further downstream in the reactor. Therefore, with increasing flow rates, increasingly longer reaction zones are required within the reactor to remove hazardous components to an acceptable level. In the limit, at a flow rate requiring the entire scrubber media bed to reduce the concentration of hazardous components to an acceptable level, a scrubber system operated in such a mode would have no capacity.

Reactors operated at ambient conditions generally exhibit reaction rates significantly slower than heated systems. A system operating at ambient conditions requires either very reactive scrubber media or effluent gas stream flow rates which are low relative to the size of the scrubber bed volume (generally less than 1 bed volume/minute) to realize their maximum chemical capacity.

Thus there is a need for a chemical scrubbing system to abate hazardous gas effluent emissions from etching and related processes in the semiconductor industry. The scrubbing system should have high volumetric efficiency for the hazardous components of the effluent gas stream, comprising both a high capacity and a rapid reaction rate with the hazardous species, and should be an effective scrubber at ambient temperatures.

SUMMARY OF THE INVENTION

In one aspect, the present invention relates to scavenger compositions for removing from a gas stream at least one compound selected from acidic gases including mineral acids such as hydrogen chloride, hydrolyzable metal halides such as boron trichloride, tungsten hexafluoride or halosilanes, reducible organic compounds such as phosgene, hydrolyzable inorganic compounds such as thionyl chloride, and halogens such as chlorine. The present invention further relates to a method for synthesizing the same scavengers. In yet a further aspect, the present invention relates to a process of removing such compounds from gas streams with the same scavengers.

The scavenger compositions of the present invention provide a high volumetric efficiency for scrubbing the hazardous components of the effluent gas streams, providing both a high capacity and a rapid reaction rate with the hazardous species. To the extent practical, the scavenger compositions are composed only of moieties that react with the hazardous components and are largely free of void space, thus providing the maximum volume of chemically reactive species within the reactor volume. To provide access to all of the chemically reactive species present, the scavenger compositions of the present invention are "ablative." The scavenger compositions are polymeric and tend to depolymerize as they scrub, thus providing fresh surfaces. In addition, the reactions involved in scrubbing lead to volatile products, creating openings in the scrubber mass, providing access pathways for the hazardous gases to contact fresh material within the mass. The capacity of the scrubber medium is thereby maximized.

The scavenger compositions of the present invention comprise metallic "macromers," three-dimensional polymeric structures comprising transition metal centers bridged by organic and/or inorganic moieties. The metallic macromers of the present invention contain at least two "oxomeric" chains pendant to metal coordination atoms therein. The "oxomers" are oxygen-containing groups which are coordinated to the metal coordination atoms in the macromeric complex of the invention, and comprise at least one repeating unit of —O—C(O)—O—, —O—C(O)—, —O—S(O)—O—, —O—Si(O)$_2$—O—, optionally interconnected between successive repeating units of such formulae by a divalent organo group, such as alkylene. At least one oxo (—O—) group coordinates with the metal. When used to scrub acidic effluent gases, these scavenger compositions ablate to continually provide fresh flow pathways and access to the reactive species. For example, the carbonate linkage (—O—C(O)—O—) reacts with acid gases to release $CO_2$. The metal centers are thus presented in such a way that maximizes their capacity to react with the hazardous gas components. The transition metal centers are selected from group IB, IIB, IVB, VIIB, and VIIIB metals of the Periodic Table, especially iron, chromium, manganese, cobalt, nickel, copper, rhodium, ruthenium, and iridium.

The method of the present invention for synthesizing the metallic macromers comprises the steps of mixing aqueous or alcoholic solutions of metal salts with aqueous or alcoholic solutions of oxomeric materials such as carbonate, carboxylate, sulfite, or silicate, with optional added binder materials, and drying and forming the reaction product into convenient shapes for use as a scrubber medium. Preferred oxomeric materials include carbonate, malonate, malate, succinate, adipate, citrate, and other hydroxy carboxylic acids and dicarboxylic acids, and silicate. The reaction mixture may be heated and/or stirred for some period of time prior to the drying step. Preferred morphologies for the scrubber medium include pellets and extrudates ("noodles").

The scrubbing method of the present invention comprises a process of removing hazardous components from acidic gas effluent streams by contacting the scavenger. The exhaust gas is contacted with the active scavenger comprising metallic macromers while passing through a column or vessel filled with the scavenger. The acidic waste compounds are removed from the exhaust gas by sorption to obtain a cleansed gas. The term "sorption" as used herein means that the hazardous gases are removed from the exhaust gas and fixed by the scavenger by chemical reaction between the hazardous gases and the scavenger, and, therefore, the sorption is distinguished from mere physical adsorption or absorption. That the scrubbing mechanism is sorption is an advantage of the present invention.

The process of treating acidic effluents using the present invention can conveniently be carried out at temperatures from ambient to 100° C. Ambient temperature is preferred for customer convenience and economic reasons. The present invention is preferably practiced at ambient pressure, although there is no fundamental reason either reduced or elevated pressures would not be effective. At low pressure, the contact time in the bed decreases, requiring larger beds to maintain kinetic efficiency. At elevated pressures contact time increases, decreasing the necessary bed size. In a common application of this invention, the scrubber may be placed downstream of the process vacuum pump and used at ambient pressure or just slightly below.

Other aspects and features of the invention will be more fully apparent from the ensuing disclosure and appended claims.

DESCRIPTION OF THE DRAWINGS

The FIGURE shows infrared spectra of copper carbonate (trace A), copper citrate (trace B), and three scavengers prepared according to the method of the present invention for use as scavengers: iron carbonate (trace C), an iron carbonate-malate-silicate material (trace D), and an iron carbonate-citrate-silicate material (trace E).

DETAILED DESCRIPTION OF THE INVENTION, AND PREFERRED EMBODIMENTS THEREOF

The present invention provides reactive scavenger compositions which, when used as scrubber media in heterogeneous reactors employed for hazardous gas abatement, provide improved volumetric efficiency over currently employed scavengers, especially for scrubbing acidic gas effluents. The scavenger compositions are composed (to the extent practical) only of moieties which react with the species of interest present in the stream. To form effective scrubber media, the scavenger compositions are rendered into forms that have minimal void space, thus placing the maximum amount of chemically reactive species practical within the reactor volume. Merely filling the available reactor space with reactive materials does not necessarily lead to utilization of the bulk of the scavenger, but the scavenger compositions of the present invention, when used to scrub acidic effluent gases, ablate to continually provide fresh flow pathways and access to the reactive species. Therefore their capacity to react with the hazardous gas components is maximized.

In the present invention, maximum utilization is accomplished by preparation of a scrubber mass composed of polymeric strands that consist of transition metal centers bridged by organic and/or inorganic moieties. Illustrative formulas are:

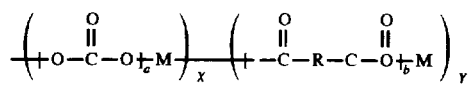

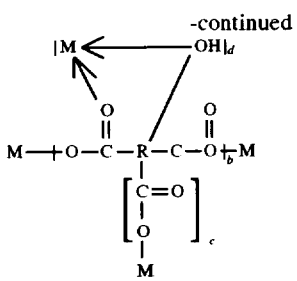

The metal center M is should be able to coordinate about it m number of charged moieties, shown as the type a or b moieties above, based upon its charge. Thus, the number of each type of moiety interacting with a particular metal center in this fashion may be any number from 0-m. If m=2, for example iron(II), the metal could be coordinated to 0, 1, or 2 type a moieties (for example, carbonates) and correspondingly 2, 1 or 0 type b moieties (for example, dicarboxylates). Furthermore, the metal centers may be linked by repeating units of a random number of type a and b moieties bridging between metal centers. In the representative formulas shown above, these are shown as type X and Y repeat units. The number of times a repeat unit appears in a particular chain of bridged metal centers may be any number from 0 to the maximum number of subunits appearing in a particular chain. The type b bridging moieties may contain from 2 up to z anionic ends which may participate in the formation of chains of z-1 dimensions through interaction with up to z metal centers.

Polymeric materials of the present invention, in which the metals are bridging as shown in the representative formulas above, are preferred over polymers in which the metals are merely coordinated to active sites in an organic polymer, because of these present invention polymers can scrub acid gases ablatively. Additionally, it will be appreciated that metal centers after having coordinated sufficient charged species to satisfy their valence requirements may coordinate p number of additional moieties in the manner represented in the lower formula above. The illustration depicts coordinative bonding to a metal center of a second polymer chain by electron lone pairs from π-bonded oxygen moieties in the first chain. It can be appreciated that any species with polarizable electron pairs can participate in this type of interchain coordination. This applies equally well to the oxygen lone pairs of carbonate moieties (type a fragments). The number of additionally coordinated moieties (value of p) depends upon the nature of the particular metal center employed. Thus, the R group of type b bridging moieties may contain structures which interact chemically according to the general principles expounded herein for simple difunctional bridging species, yet lead to more complex polymeric structures than illustrated here.

Polymers made using these principles are unstable in the presence of the hazardous species which the mass is intended to scrub, and when such species are present the mass depolymerizes with the formation of stable metal adducts. Additionally, some of the bridging species are selected so that, upon reaction with certain hazardous components of the gas stream, volatile products are formed, creating openings in the scrubber mass and thereby providing access pathways for the hazardous moieties to contact fresh material within the mass.

Metals are selected based on the following criteria. The metal itself should not be toxic, or the ultimate disposal of the spent scrubber medium will become difficult. Metals that have more than one accessible oxidation state are preferred. The cost of the metal must be reasonably low, to enable production of economical scrubber media. Transition metals of groups IB, IIB, IVB, VIB, VIIB, and VIIIB are advantageous, with group VIIIB and IB metals being preferred and iron in the dipositive oxidation state most preferred.

The "oxomeric" bridging species are oxygen-containing groups which are coordinated to the metal coordination atoms in the macromeric complex of the invention, and comprise at least one repeating unit of —O—C(O)—O—, —O—C(O)—, —O—S(O)—O—, —O—Si(O)$_2$—O—, optionally interconnected between successive repeating units of such formulae by a divalent organo group, such as alkylene. At least one oxo (—O—) group coordinates with the metal. These oxomeric bridging groups must also be selected on the basis of functional groups, absence of significant toxicity, and low cost. Bridging species are selected from the group of carbonates, di- or polyfunctional carboxylates, di- or polyfunctional oxy- and hydroxycarboxylates, di- or polyfunctional phosphorous, sulfurous, nitrogenous, and silicious oxides, borates, chlorates, aluminates, sulfamates, di- or polyfunctional aminates, and discrete organics containing di- or polyfunctional analogs of any of this class of materials. Carbonate, carboxylate, sulfite, and silicate are the preferred bridging species. Of the carboxylates, malonate, malate, succinate, adipate, citrate, and other hydroxy carboxylic acids are especially useful because they can be formulated into very effective scavengers and have low cost and low toxicity.

In a preferred embodiment, the bridging species are combined in such a way as to yield a mass having carbonate, carboxylate, and third member bridging moieties coordinated to the metal center so that the ratio:

metal/carbonate/carboxylate/third member bridging moieties falls within the range of

1/0–2/0–2/0–2.

Preferred embodiments have mole ratios:

iron/carbonate/carboxylate/sulfite of approximately

1/0.5–0.98/0.02–0.5/0 and 1/0.5–0.98/0.02–0.5/0.02–0.6.

With the inclusion of sulfite, the latter formulation is especially useful for scrubbing halogens such as chlorine. Racemic malate is especially preferred as the carboxylate species, since it is cheap, of low toxicity, and may be formulated into an effective scavenger.

Reactive scavengers can be designed such that the products arising from the reaction of one hazardous species may be used to react with and trap a second, different hazardous species, increasing the utility of a given reactive scavenger mass for mixed gaseous effluent streams. Mixed effluent streams are generated by many etch processes which generate gaseous acid waste as well as chlorine or other halogen. Scrubber media used to scrub hydrogen chloride to total exhaustion of scrubbing capacity have further capacity to scrub chlorine, as described in more detail in Example 7 below. However, it can readily be appreciated that these advantages are readily extendible to any gaseous waste stream containing moieties capable of entering into a chemical reaction.

The scavenger compositions of the present invention must have a physical morphology that is suitable for scrubbing a gas stream without compressing, fracturing to form dust, or in any other way clogging conduits or blocking the flow of gas. The scavengers are suitably pelletized, extruded, otherwise shaped or employed in monolithic form. To this end the present invention may employ binder materials whose function is to provide physical stability and improved handling properties. The present invention preferably employs a 1–25 weight percent of sodium silicate to serve as a binder. The addition of sodium silicate during preparation of the scavengers causes the reaction product to precipitate, allowing easy separation of the reactive mass and processing solvent. The silicate also forms an inert mass which interpenetrates the reactive mass, providing a stabilizing structure to the reactive mass as it is consumed during its use as a scrubber.

Other hydrated materials capable of gelation and subsequent formation of a metal oxide glassy matrix would serve the binder function equally well, such as hydrated titanium oxides, zirconium oxides, phosphates, or zinc oxides. In order to scrub some of the noxious gases that can be present in semiconductor etch or CVD process effluents, such as phosgene ($COCl_2$) or carbonyl fluoride ($COF_2$), quite basic sites may be needed. If so, more basic oxides such as zinc oxide or calcium oxide will be useful binder materials. Inert additives such as molybdenum disulfide, which provides a rubbery texture, can be employed as binders.

In the preferred embodiment of the present invention, the reactive mass is combined with binder, separated from the processing solvent, formed it into "noodles" by extrusion through a die plate. Before it is dried, the scrubber media is reasonably plastic and would just as easily lend itself to being formed into a number of shapes for use as monolithic elements.

The scavenger compositions of the present invention may be synthesized by a number of different procedures. Two major processes and variants upon these processes are disclosed. These may be broadly classified as "building up" strands of reactive material by stepwise addition of subunits of the reactive mass, or simultaneous precipitation of randomly organized moieties by reaction of a precursor transition metal carbonate with an organic acid.

Reactive scavenger masses of the type disclosed in the present invention may be synthesized containing only carbonate and iron with a binder material or containing any one of a wide variety of polyfunctional carboxylates and other bridging moieties useful in scrubbing hazardous materials other than acid gases, such as sulfite for the purpose of scrubbing chlorine or other halogens.

Scavengers containing only carbonate and metal with a binder material can be prepared by, for example, allowing aqueous or alcoholic solutions of iron(II) chloride and sodium carbonate to react under nitrogen. A binder solution may optionally be added to the carbonate solution before addition of the iron chloride. After the reaction mixture has been stirred and heated, the product is dried under an inert atmosphere. This type of preparation is exemplified by the iron carbonate scavengers prepared in Example 1, Samples 1 and 2 below.

One synthetic procedure allows for the random, simultaneous reaction of a number of moieties placed into solution together. In this method (exemplified below in Example 1 for Samples 3, 4, 6, 8, and 9), a dicarboxylic acid and a transition metal salt are dissolved in water to a specific molar ratio. $NaHCO_3$ and/or $Na_2CO_3$ solution is added to this mixture. This addition deprotonates the dicarboxylic acid to yield a form capable of reaction with the transition metal chloride, while at the same time the alkali carbonate is also capable of reacting with the transition metal chloride. The result is the formation and precipitation of randomly organized "chains" of material containing the transition metal bridged to other transition metal centers through either the dicarboxylic acid or carbonate moiety.

A variation on this strategy (exemplified below in Example 1 for Samples 5 and 7) is to form the soluble transition metal complex $LiCO_3MCO_3Li$ (where M is a suitable transition metal) as a precursor species. This species is then allowed to react with limited quantities of dicarboxylic acid, which removes bicarbonate moieties from the transition metal to form the carboxylate. Control of the stoichiometry and concentration of the species involved leads to the formation of structures of random length wherein transition metal centers are bridged by carbonates and carboxylate moieties.

An alternative method (exemplified below in Example 1 for Sample 10) is to precipitate the transition metal carbonate, take the precipitate up into an aqueous slurry, and infuse carboxylic acid into the slurry. The carboxylic acid reacts randomly with transition metal carbonate bridging moieties, resulting in the random insertion of carboxylate moieties into the structure.

The preferred embodiment of the present invention yields material containing a transition metal selected from the group of first second and third row transition metals of groups IB, IIB, IVB, VIB, VIIB, and VIIIB, with group VIIIB and IB metals being preferred, and iron in the dipositive oxidation state the most preferred, and an oxomeric bridging species selected from the group of carbonates, di- or polyfunctional carboxylates, di- or polyfunctional oxy and hydroxy carboxylates, di- or polyfunctional phosphorous, sulfurous, nitrogenous, and silicious oxides, chlorates, borates, aluminates, sulfamates, di- or polyfunctional aminates, and discrete organics containing di- or polyfunctional analogs of any of this class of materials, with carbonate, carboxylate and sulfite preferred as bridging species. Combinations of carbonate and carboxylate selected from the group malate, malonate, succinate, adipate, and citrate are most preferred for acid gas scrubbing, with the addition of sulfite for chlorine scrubbing capability. The scavenger compositions as synthesized contain carbonate, carboxylate, and third member bridging moieties coordinated to the metal center. They are prepared such that the mole ratio of reactants Fe salt/carbonate/(CO$_2$)$_2$R/third member bridging moieties lies in a range of 1:2:0:0, 1:0:2:0, and 1:0:0:2, with the most preferred embodiments being combinations of reactants such that the ratio:

metal/carbonate/carboxylate/third member bridging moieties falls within the range of

1/0–2/0–2/0–2.

Preferred embodiments have mole ratios of reactants:

iron/carbonate/carboxylate/sulfite of approximately

1/0.25–0.75/0.25–0.75/0 and 1/0.2–0.5/0.2–0.5/0.2–0.6.

To convert the reactive scavenger mass into a physical form usable for scrubbing a gas stream in a simple canister, it is necessary to render the reaction product into a pelletized, shaped or monolithic form. To this end, a 1–25 weight percent sodium silicate solution may be added during synthesis to serve as a binder. When mixed with the reactive mass as it exists in the reaction vessel following its preparation, sodium silicate renders the moieties comprising the reactive scavenger mass insoluble in the process solution, thus permitting easy separation of the reactive scavenger mass and processing solvent by filtration, decantation, centrifugation, or other appropriate means.

In a preferred embodiment, the scavenger of the present invention employs iron in the +2 oxidation state. Such Fe(II)-based scavengers can scrub halogens by a redox reaction, which Fe(III)-based scavengers cannot. In addition, by contrast with iron(III), iron(II) forms a stable carbonate. This carbonate is acid-unstable and scrubs acids by a reaction that forms carbon dioxide. Thus scavengers containing iron(II) carbonate moieties can scrub acidic gases ablatively, which allows fresh scavenger surface to be continually exposed. An ablative scrubbing mechanism leads to higher capacities and less likelihood of clogging.

For practical use, scavengers that are stable to oxidation in air at room temperature are preferred. Stabilizing the iron(II) oxidation state requires the presence of stabilizing species such as the carboxylate and silicate moieties. In practice, the air stability of the iron(II)-based scrubbers of the present invention depends on the proportions of iron, silicate binder, and hydroxycarboxylate moiety. The iron(II) carbonate material as prepared by the method of the present invention is not air-stable, but becomes so as the proportions of carboxylate and silicate are increased. However, if the carbonate is totally replaced by silicate, the scavenger, while completely air-stable, has no scrubbing capacity. Thus the silicate must be present in a proportion sufficient to impart the desired physical properties but not so high as to remove scrubbing capacity. A particularly preferred embodiment uses carbonate, carboxylate, and iron in approximately equimolar quantities in the reactant mixture with 0–0.5 mole fraction silicate.

The silicate also forms an inert mass which interpenetrates the reactive scavenger mass, physically stabilizing the reactive scavenger mass as it is consumed during its use as a scrubber. Other hydrated materials capable of gelation and subsequent formation of a metal oxide glassy matrix would serve this function equally well. In a preferred embodiment of the present invention, the reactive mass is combined with binder, separated from the processing solvent, and formed into "noodles" by extrusion through a die plate. Before it is dried, the scrubber medium is reasonably plastic and would just as easily lend itself to being formed into a number of shapes for use as monolithic elements.

The combined reactive mass and binder may be dried in air at ambient conditions or in a vacuum chamber at moderate temperatures. The material must be dried to the point where sufficient water of hydration has been removed to allow three dimensional polymerization to occur. It is not desirable to remove all of the water. Acid halides such as boron trichloride must be hydrolyzed to be scrubbed, and if the scavenger is completely dry, it will not be able to scrub such noxious species. The amount of water retained in the scavenger composition should be in the range of 5–50 weight percent, with 10–20% preferred, and 11–15% most preferred. A filter press can be used initially to squeeze out most of the water to be removed, with the remainder to be removed by drying under air or nitrogen at room temperature or at temperatures up to 100° C. at most, but preferably under 50° C.

The scavenger compositions as prepared are very insoluble in water, alcohol or other common solvents. For the preferred iron-based scavengers, the amount of iron that could be extracted out of the scavenger material was assayed calorimetrically. Essentially no measurable iron was detected in the aqueous supernatant after mixing the scavenger materials with water. This lack of water-solubility is in contrast to the behavior of the starting materials, most of which are highly water-soluble compounds such as hydoxycarboxylic acids or iron(II) salts. In addition, during scavenger preparation there is a dramatic increase in viscosity of the scavenger suspensions during preparation. The materials typically become very gelatinous or thick during the reaction.

The scrubbing method of the present invention comprises a process of removing hazardous components from acidic gas effluent streams by contacting the scavenger. The exhaust gas is contacted with the active scavenger comprising metallic macromers while passing through a column or vessel filled with the scavenger. The acidic waste compounds are removed from the exhaust gas by sorption to obtain a cleansed gas. The term "sorption" as used herein means that the hazardous gases are removed from the exhaust gas and fixed by the scavenger by chemical reaction between the hazardous gases and the scavenger, and, therefore, the sorption is distinguished from mere physical adsorption or absorption. That the scrubbing mechanism is sorption is an advantage of the present invention.

The process of treating acidic effluents using the present invention can conveniently be carried out at temperatures from ambient to 100° C. Ambient temperature is preferred for customer convenience and economic reasons. The present invention is preferably practiced at ambient pressure, although there is no fundamental reason either reduced or elevated pressures would not be effective. At low pressure, the contact time in the bed decreases, requiring larger beds to maintain kinetic efficiency. At elevated pressures contact time increases, decreasing the necessary bed size. In a common application of this invention, the scrubber may be placed downstream of the process vacuum pump and used at ambient pressure or just slightly below.

The method by which the utility of the present invention is demonstrated is exposure of a measured sample of the scavenger to a gas stream containing the species to be removed from a gas effluent stream. This exposure is carried out using equipment which is designed to dispense reactive gas in a controlled fashion. The equipment provides the ability to dispensed gas stream(s) which are either diluted with inert gas or used neat from the cylinder. The equipment additionally has provisions to measure the time elapsed from the commencement of gas flow through the sample and instantaneous flow rates of all gases dispensed by the manifold, thus at any time during and at the end of the experiment the total mole amount of dispensed gases can be calculated. The dispensed gas is conducted into a sealed reaction tube which has been fitted with a support for the scavenger sample and inlet and outlet ports. The outlet of the reactor is monitored by a detector suitable for the hazard gas being admitted into the reactor in a specific experiment. The test is concluded when the amount of hazardous gas detected in the outlet gas stream exceeds a level deemed safe for human contact, typically the TLV for the gas being scrubbed.

To conduct a test, the sample is placed into the reactor and sealed. The reactor is placed in line with the gas dispensing and monitoring equipment, and the hazardous gas is permitted to flow. When concentrations of the hazardous gas exceed TLV in the outlet stream of the test reactor, the run clock and hazardous gas flow are stopped. The number of moles of hazardous gas dispensed into the sample is calculated as a function of the flow rate and flow time. This result is divided by the volume (in liters) of the sample to arrive at the reported capacity, that is, the number of moles of hazardous gas consumed per liter of scrubber medium under the conditions of the test.

The scavengers of the present invention are stable upon storage at room temperature. Exposure to air or moisture does not compromise the effectiveness of the scrubbing process.

In an effluent gas scrubber, the scavenger may be contained in any container, as would be known to one skilled in the art. Gas stream flow may be either upwards or downward. Downward flow is preferred at high flow rates to prevent fluidization of the scavenger bed, which can diminish scavenging efficiency, result in the attrition of bed solids via erosion of the fluidized solids, and involve carry-out of fines with the effluent gas discharged from the scavenger bed. Alternatively, upward flow can be used with the bed stabilized against fluidization by a retaining or spring plate.

The scrubbing process may be carried out with or without a particle filter mounted before the scavenger vessel. The purpose of the particle filter is to trap any particulates or dust generated in the etch or CVD reactor.

The scavenger vessel and scrubbing system may advantageously be the same as or similar to those that are described and illustrated in U.S. Pat. Nos. 5,037,624 ("Composition, Apparatus, and Process, for Sorption of Gaseous Compounds of Group II–VII Elements") or 5,151, 395 ("Bulk Gas Sorption and Apparatus, Gas Containment/ Treatment System Comprising Same, and Sorbent Composition Therefor"), or other systems that are commercially available or are well known to those skilled in the art.

The features and advantages of the invention are more fully illustrated by the following non-limited examples, wherein all parts and percentages are by weight, unless otherwise expressly stated, and solution concentrations are molal (m) unless otherwise denoted.

EXAMPLES

Example 1. Preparation of Scrubber Samples

Sample 1

Aqueous 5.116 molal $FeCl_2$ and 0.304 molal $Na_2CO_3$ solutions were prepared. Using these solutions, 0.50 moles $FeCl_2$ was placed into a vessel under a nitrogen purge. 0.50 moles $Na_2CO_3$ was added drop-wise to the $FeCl_2$ solution. The resulting solution was held unstirred under an inert atmosphere for 12 hours at room temperature. A clear supernatant layer formed and was decanted. A brown precipitate was separated from the remaining aqueous supernatant by gravity filtration. The resulting mud-like residue was dried under a nitrogen stream. The dry material was light tan to brown and rocky in appearance; it was broken into irregular chunks or granules larger than 8 mesh, with most approximately 12×20 mesh.

Sample 2

A "Water Glass" solution having a nominal stoichiometry of $Na2O(SiO_2)_2$ was made by dissolving 0.941 moles of silica gel in 160 ml of $H_2O$ with the aid of 0.472 moles NaOH. The final density of this solution was 1.92 g/ml. 1.744 molal aqueous $Na_2CO_3$ and 1.280 molal methanolic $FeCl_2$ solutions were prepared. Using these solutions, 0.218 moles of $Na_2CO_3$ was placed into a vessel, blanketed with nitrogen, and heated to 35° C. Into the whole of the sodium carbonate solution was added in one aliquot 5 ml of the "water glass" solution with stirring. To the resultant solution was added in one aliquot an amount of the iron chloride solution containing 0.081 moles of $FeCl_2$. Throughout additions an inert blanket of nitrogen and a temperature of 35° C. were maintained. After the iron chloride was added, a pale olive green precipitate formed. The precipitate was separated from the supernatant via gravity filtration and dried under an argon stream at room temperature for several hours. When the material had acquired sufficient body to hold its shape after extrusion it was place into a 50 ml syringe and extruded into noodle-like shapes. The "noodles" were placed into a shallow glass dish. The shaped material was permitted to further air dry over 12 hours. When dry the material was brittle and olive drab, becoming orange/brown upon several days of exposure to air. The final sample consisted of 2–3 mm×5–15 mm cylinders.

Sample 3

A buffered 6.5 molal lithium malonate solution was prepared by adjusting the pH of a 6.5 m aqueous malonic acid solution to 6.0 using lithium hydroxide powder. An aqueous 6.8 molal aqueous $FeCl_2$ solution was prepared. "Water Glass" was prepared as in Example 1. Using these solutions, 0.136 moles $FeCl_2$ was added in one aliquot to 0.065 moles malonate with vigorous stirring under an inert atmosphere at room temperature. After five minutes, 0.136 moles of $Na_2CO_3$ was added in small amounts over 15 minutes with continued stirring. The solution was stirred for five additional minutes and then left quiescent under an argon blanket for two hours. A dark precipitate settled out during this time. The supernatant liquid was decanted. The precipitate was separated from residual water by gravity filtration and washed with twice its volume of deionized water using two equal aliquots. The dark, rubbery material thus isolated was dried under an argon stream at room temperature for 48 hours. The dried material was mixed with 5.3 times its weight of the "water glass" solution. It became plastic with a granular texture. This material was formed into a sheet ⅛–3/16" thick on a glass plate. After 1 hour of drying in the air at room temperature, the dough-like sheet was cut into squares approximately ¼" on a side and permitted to air dry at room temperature an additional 48 hours. After 48 hours the sample was hard, dark, and glassy.

Sample 4

Aqueous solutions of 3.1 molal $FeCl_2$, 1.25 molal $NaHCO_3$, and 3.84 molal malic acid were prepared. Using these solutions, 0.304 moles $FeCl_2$ was measured into a flask and placed under a nitrogen sparge. 0.499 moles malic acid was added to the iron chloride solution quickly at room temperature in one aliquot with vigorous stirring while maintaining the nitrogen sparge. With continued stirring and nitrogen purge, 0.501 moles $NaHCO_3$ was added. The resulting solution was stirred gently under a nitrogen blanket at room temperature for 12 hours. After 12 hours the thick, dark liquid was transferred into a bottle fitted with a nitrogen jet. The water remaining in the suspension was evaporated using the jet until the solid material hardened. The resulting light olive green material crumbled easily, and was pulverized by pressing on it with a plastic rod. The fragments were classified in analytical sieves, the fraction passing 20 mesh and retained on 40 mesh being saved.

Sample 5

Aqueous solutions of 1.50 m $NaHCO_3$, 1.00 m $FeCl_2$, 1.51 m LiOH, and 1.75 m malic acid were prepared. A commercially available sodium silicate solution nominally containing 11.0% $Na_2O$ and 31.7% $SiO_2$ and having a density of 1.47 was obtained (Philadelphia Quartz). Using these solutions, 0.150 moles $FeCl_2$ was poured concurrently with 0.300 moles $NaHCO_3$ into a third vessel which was being purged with a stream of nitrogen and vigorously agitated. After the entirety of the two solutions had been combined, an additional 0.150 moles $NaHCO_3$ was poured in one aliquot into the combined solution, with continued stirring and nitrogen purge. The vessel was subjected to gentle heating (30°–40° C. on an electric hot plate) and vigorously stirred under a nitrogen blanket for 0.5 hour.

At the end of the 0.5 hour reaction time, 0.302 moles LiOH was added in one aliquot by pouring it into the reaction mixture under nitrogen purge. The reaction mixture was stirred under a nitrogen blanket at 35°–45° C. for fifteen minutes. 0.175 moles malic acid was added in one aliquot. The reaction mixture was agitated (magnetic stir bar and nitrogen sparge) vigorously for 90 minutes, while the temperature was maintained at 35°–45° C. 0.05 moles sodium silicate was added by pouring 14.087 g of the commercial sodium silicate solution into the reaction mixture. Following this addition the mixture was stirred for a further two hours under nitrogen. Heating and agitation were discontinued, and the precipitate which had formed from the reaction mixture was allowed to settle out under a nitrogen blanket over 48 hours. After 48 hours the precipitate was separated from the supernatant by gravity filtration. The resulting light tan/green to dark olive green gelatinous precipitate was shaped in the form of round "noodles" using a piston extrusion device and permitted to dry in the air for 24 hours. The hard, brittle "noodles" were broken into pieces ¼ inch to ½ inch long with a spatula and placed into a sealed bottle.

Sample 6

Solutions of 1.00 m aqueous $FeCl_2$, 1.50 m succinic acid in 11% ethanol/89% water, 5.30 m aqueous LiOH, and 2.30 m aqueous $Na_2CO_3$ were prepared. A commercial sodium silicate solution nominally containing 11.0% $Na_2O$ and 31.7% $SiO_2$ and having a density of 1.47 was obtained (Philadelphia Quartz). Using these solutions, 0.10 moles of $FeCl_2$ was placed in a reaction vessel under a nitrogen blanket and agitated with a magnetic stir bar. The solution temperature was maintained 35°–40° C. throughout the synthesis. Into the iron chloride solution 0.05 moles succinic acid was added by pouring the entire amount of the acid solution into the iron chloride solution in one aliquot over a short period of time. Following this addition the tube conducting nitrogen into the reaction vessel was lowered into the reaction mixture to act as a sparging device. 0.05 moles LiOH was added in the same manner as the acid solution. The reaction conditions were maintained following the base addition, and the reaction mixture was agitated for 0.5 hour. After this agitation period 0.15 moles of $Na_2CO_3$ was added to the blue/gray reaction mixture using the same technique as for the two previous additions. The reaction mixture was then vigorously agitated for 1 hour.

At the end of 1 hour the heat source and stirring were removed from the reaction mixture, and the dark precipitate was permitted to settle out over 12 hours. This precipitate was separated from the supernatant by decantation. The resulting muddy material was placed in a bottle and dried further under a nitrogen jet. After several hours of drying the material acquired a gelatinous consistency. This material was then mixed with an amount of the commercial sodium silicate solution nominally containing 0.10 moles of sodium silicate and shaped using a piston extrusion device. The resulting "noodle-like" shapes were placed on a glass sheet and dried to hardness under a nitrogen jet. The dry noodles (3–4 mm diameter by 0.5–1.0 cm long) were dark gray/blue/green, hard, and brittle.

Sample 7

Aqueous solutions of 3.00 m $FeCl_2$, 1.50 m LiOH, and 0.755 m $Na_2CO_3$ were prepared. 100 g deionized, room temperature water was placed in a reaction vessel sparged with argon and agitated with a magnetic stir bar. An argon blanket was kept over the reaction mixture throughout additions. A slurry was made by adding 0.150 moles adipic acid to the deionized water at room temperature. Using the solutions prepared earlier, 0.150 moles LiOH was poured into the slurry in one aliquot with stirring, resulting in a yellow solution. Into this solution was poured 0.300 moles $FeCl_2$ in one aliquot. The addition of the iron chloride produced a brown solution and white precipitate. An additional 150 g of room temperature water was added following addition of the $FeCl_2$.

0.151moles $Na_2CO_3$ was added to the reaction mixture in one aliquot. Vigorous effervescence accompanied this addition. Following carbonate addition the reaction mixture was heated to 35°–45° C. and stirred for 3 hours under argon. After 3 hours the material was poured into a storage bottle and the brown/white precipitate was allowed to settle out of the dark solution. The precipitate was isolated by vacuum filtration and dried to hardness using a nitrogen jet over the next several weeks.

Sample 8

Aqueous solutions of 2.67 molar (M) $FeCl_2$, 1.2 m $NaHCO_3$, 2.00 m LiOH, and 0.6 m citric acid were prepared. A commercial sodium silicate solution nominally containing 11.0% $Na_2O$ and 31.7% $SiO_2$ and having a density of 1.47 was obtained (Philadelphia Quartz). These solutions were used for the following steps. 0.101 moles $FeCl_2$ was placed into a reaction vessel which had been purged with argon simultaneously with 0.300 moles $NaHCO_3$. The mixture was stirred at 30°–40° C. under argon for 90 minutes, whereupon 0.200 moles of LiOH was added in one aliquot with stirring. The reaction mixture was stirred for a further 20 minutes at 30°–40° C. under argon. 0.06 moles of citric acid was then added, and the mixture was stirred for 70 minutes, maintaining the 30°–40° C. temperature and argon blanket.

Following the stirring period, 0.036 moles of sodium silicate was added to the reaction vessel, while maintaining the 30°–40° C. temperature and argon blanket throughout the addition and subsequent agitation period. The reaction mixture was stirred for 20 minutes after silicate addition, and then temperature control and agitation in the reactor were discontinued. The reaction mixture was left unstirred at room temperature for 48 hours. The resulting gel was formed into noodle-like shapes and dried under a stream of nitrogen. The dark olive-green "noodles" were stored in a closed bottle for later use.

Sample 9

Aqueous solutions of 1.75 m $FeCl_2$, 0.993 m oxalic acid, 1.00 m LiOH, and 1.50 m $Na_2CO_3$ were prepared. Using these solutions, 0.100 moles $FeCl_2$ was placed into a reaction vessel purged with nitrogen which had passed through a purifier to remove oxygen. The solution was stirred vigorously at room temperature. 0.0497 moles oxalic acid was added by pouring it into the reaction vessel in one aliquot under nitrogen. 0.0510 moles LiOH was immediately added to the reaction vessel followed by 100 ml of degassed water. The reaction mixture was stirred under nitrogen for 30 minutes. At the end of this time 0.150 moles $Na_2CO_3$ at 30° C. was added to the reaction vessel using the same methodology as the previous additions. The reaction mixture was stirred under nitrogen for an additional 90 minutes, and then the material was left quiescent under nitrogen for 12 hours.

The resulting yellow/white precipitate was separated by decantation and dried under a nitrogen jet until it had the consistency of dry clay. This light colored material crumbled easily to a powder having a size of about 30–180 mesh.

Sample 10

Aqueous solutions of 1.00 m $FeCl_2$, 1.50 m $NaHCO_3$, 1.51 m LiOH, and 1.75 m malic acid were prepared. Using these solutions, 0.150 moles $FeCl_2$ and 0.450 moles $NaHCO_3$ were combined in small aliquots keeping the ratio of $FeCl_2$ and $NaHCO_3$ constant at a mole ratio of 1:3. As the solutions were mixed, the mixture was drained into a vessel containing 3.3 moles of water heated to 50° C. The resulting mixture was stirred for 15 minutes at 50° C. An inert gas blanket was maintained within this vessel throughout the addition and subsequent steps.

After stirring was completed, an amount of the LiOH solution containing 0.300 moles of LiOH was added in one aliquot to the reaction mixture. The temperature and inert blanket were maintained while the reaction mixture was stirred for 15 minutes. At the end of this time 0.180 moles of malic acid was added in a similar manner with all reaction conditions maintained as before. The reaction mixture was agitated for one hour.

At the end of the agitation period, 0.05 moles sodium silicate was added to the reaction mixture. The agitation, temperature, and inert gas blanket were maintained for two hours, and then the reaction mixture was left quiescent for 12 hours at 50° C. under nitrogen. At the end of this time the precipitate was separated from the reaction solution by vacuum filtration. The resulting gel was then formed into cylindrical shapes and dried under a stream of dry, inert gas. The olive-gray solid was stored in a sealed bottle for later use.

Sample 11

Aqueous solutions of 4.30 m $FeCl_2$ and 1.40 m LiOH were prepared and used in subsequent steps. At room temperature and under an argon blanket, a solution was prepared by mixing 0.0825 moles malic acid and 0.0825 moles $NaSO_3H$ as dry powders and then adding the solid mixture slowly to 25 g of water with stirring. Into this solution 0.0826 moles of LiOH was added in one aliquot. 0.133 moles $FeCl_2$ was immediately added to the reaction mixture in one aliquot, at room temperature and under an inert gas blanket. The reaction mixture was vigorously stirred during the addition.

After the iron chloride addition, 0.0826 moles of $Na_2CO_3$ powder was sprinkled into the reaction mixture with the stirring and inert blanket maintained. The reaction mixture was stirred for 30 minutes under the stated conditions, then sealed in a bottle and left quiescent for 24 hours. At the end of this time the precipitate was isolated by vacuum filtration and transferred into a crimp sealed vessel. It was brought to dryness under a stream of dry nitrogen in the sealed bottle, then broken into chunks of serviceable size (8×20 mesh). The material was blue/green in appearance.

Sample 12

Aqueous solutions of 1.50 m $FeCl_2$, 1.50 m malic acid, 1.50 m LiOH, and 1.50 m $Na_2CO_3$ were prepared. 0.150 moles of the malic acid solution was treated with aliquots of the LiOH solution in a beaker at room temperature under an argon blanket with stirring until the pH reached 4.0. The reaction mixture was then gently heated (30°–35° C.), and while maintaining the inert blanket, 0.300 moles of $FeCl_2$ was added in one aliquot. The reaction mixture was stirred for 30 minutes at 30°–35° C. under argon.

At the end of this time the reaction mixture was treated with aliquots of the $Na_2CO_3$ solution until the pH reached 7.0, at 30°–35 ° C. under argon. The temperature of the reaction mixture was then raised to boiling, and the reaction mixture volume was reduced by boiling off solvent for the next four hours. At the end of this time 0.30 moles sodium silicate was added to the reaction mixture in one aliquot. Heating was discontinued and the resulting reaction mixture was dried to hardness under an inert gas stream over the next 48 hours. The resulting hard material was broken up mechanically and classified on sieves, the material passing through a 12 mesh sieve and being retained on a 20 mesh sieve being saved. The olive-gray solid was stored in a sealed vessel for later use. It was in the form of a 12×20 mesh powder and had a bulk density of 0.43.

Sample 13

Aqueous solutions of 2.0M $FeCl_2$, 3.72 m malic acid, 4.17 m LiOH, and 1.15 m $NaHCO_3H$ were prepared. The solutions were heated to 40° C. and maintained at this temperature during subsequent steps. Using these solutions, 11.34 moles $FeCl_2$ and 31.16 moles $NaHCO_3$ were mixed in a reaction vessel under an anaerobic nitrogen blanket with stirring. The reaction mixture was agitated for one hour. 20.85 moles LiOH was then added to the reaction vessel in one aliquot with stirring. The reaction mixture was agitated for 20 minutes. 11.91 moles of malic acid was added, and the reaction mixture was agitated for an additional hour. A portion of commercially prepared sodium silicate solution nominally containing 3.78 moles of sodium silicate was added in one aliquot, and the reaction mixture was stirred for 20 minutes. At this point, the nitrogen blanket and heating system were turned off and the material was left quiescent for 20 hours at room temperature.

At the end of this time a gelatinous precipitate was separated from the supernatant liquid by vacuum filtration. This gel was formed into cylindrical shapes and dried to hardness under an air stream. The green solid was placed into a closed bottle for storage.

Example 2. Scrubbing Neat HCl

Samples 1–13 reacted readily with hydrogen chloride. The samples had bulk densities ranging from 0.2 to 0.8 g/ml. Selected samples as well as some commercially available materials were exposed to HCl gas in scrubbing capacity experiments. The details and conditions of these experiment are summarized in Table 1.

The scavengers of the present invention have a superior capacity to react with neat (100% concentration) HCl gas streams when compared with other materials which might be expected to ablate (e.g., $CaCO_3$). It was observed that, independent of preparation method and flow conditions, Samples 1 and 2 had the same reactive capacity for HCl. Since these samples had very different morphologies, they must scrub by ablation. Sample 1 was in the form of irregular chunks larger than 8 mesh, while Sample 2 was cylinders of outer diameter 2–3 mm and length 5–15 mm. Comparison of Samples 1 and 2 with KOH electrolytic lumps showed their superior physical integrity in an acid gas environment. The KOH lumps, while readily reacting with the acid gas, dissolved in the by-product water during the test, created concretions that blocked the reactor outlet.

TABLE 1

Neat HCl Scrubbing

| Sample | Flow Rate (bed volumes/min) | Bulk Density (g/ml) | HCl Consumed (moles/liter bed) |
|---|---|---|---|
| Sample 1 | 8 | 0.9 | 9 |
| Sample 2 | 5 | 0.76 | 7.3 |
| Sample 2 | 0.5 | 0.76 | 11.4 |
| CaCO3[1] | 0.7 | 0.99 | 0.8 |
| FeO(OH)[2] | 1.5 | 0.56 | 6.6 |
| FeO(OH)[2] | 0.5 | 0.56 | 9 |
| FeO(OH)[3] | 0.5 | NA | none |
| KOH[4] | 0.5–10[5] | 1.03 | 3.9[6] |
| ZnO/Al$_2$O$_3$[7] | 0.5 | 0.98 | 7.6 |

[1] ACS grade reagent, fine powder, used as received.
[2] Commercial acid scrubber supplied in the form of goethite.
[3] Mineral grade goethite, used as supplied from quarry.
[4] Electrolytic lump, ACS grade reagent, used as received
[5] Ability to effectively react with HCl gas at flow rates giving residence times over this range demonstrated. Capacity recorded is for gas flows giving 2 minute residence times.
[6] Water generated as by-broduct of reaction melted the test bed causing the reactor to plug, experiment was discontinued at a point equal to the stated capacity.
[7] A commercially available ZnO/Al$_2$O$_3$ catalyst composition.

Iron oxyhydroxide in the form of goethite is sold commercially as an acid gas scrubber. Two samples of goethite were compared. One was the commercial acid scrubbing product, which has been processed to yield a high surface area material, and the other was a sample of quarried mineral with the nominal composition FeO(OH), goethite. The comparison with Samples 1 and 2 showed that the present invention had superior performance to the goethite commercial product. The low capacity of the mineral sample was probably a consequence of its rocky, low surface area morphology. This is not true of the present invention, which relies upon its chemical composition for its superior capacity. Ablatively scrubbing scavengers of the present invention appear to have high capacity even when used in physical forms that do not have inherently high surface area.

The zinc oxide/alumina scrubber is sold commercially for scrubbing acid gas waste streams such as hydrogen sulfide or chloride in hydrocarbon streams. This material apparently also has an physical absorption component to its capacity, since it gave off HCl vapor in a manner similar to the goethite following exhaustion.

Example 3. Scrubbing Dilute HCl

Various scavengers were used to scrub dilute streams of HCl gas in argon. The particulars of these tests are summarized in Table 2.

TABLE 2

Dilute HCl Scrubbing

| Sample | Flow Rate (bed vol/min) | Bulk Density (g/ml) | Test Gas Dilution | HCl Consumed (moles/l bed) |
|---|---|---|---|---|
| Sample 4 | 6.7 | 0.75 | HCl/8% | 6.6 |
| Sample 5 | 8 | 0.44 | HCl/8% | 7.8 |
| Sample 6 | 8 | 0.67 | HCl/8% | 3.3 |
| Sample 12 | HCl = 7.5 | 0.43 | HCl/8% | 4.8 |
| FeO(OH)[1] | 8 | 0.57 | HCl/8% | 5.4 |
| ZnO/Al$_2$O$_3$[2] | 8 | 0.99 | HCl/8% | 4.4 |

[1] Commercial acid scrubber supplied in the form of goethite.
[2] A commercially available ZnO/Al$_2$O$_3$ catalyst composition.

A wide variety of preparative conditions leads to scavengers which have about the same performance. Other experiments showed that these capacities were nearly independent of flow conditions up to very high flow rates. It should be noted that bulk density was not a linear predictor of the amount of active scrubbing species contained in each sample. Factors such a weight percent binder, particle packing efficiency, and retained water can greatly affect bulk density without modifying the volumetric capacity of reactive species. Sample 12 was prepared such that the amount of reactive species could be determined gravimetrically. At the conclusion of the test, 95% of the active acid scrubbing species had been consumed. Sample 5 was similarly prepared. Utilization of the active species in this sample was found to be on the order of 80% at the conclusion of the test. Clearly, these data demonstrate that the scavenger ablates during scrubbing.

Example 4. Dilute HCl Scrubbing

Scavengers prepared using various organic acids as the oxomeric linking species were compared. Sample 3 (malonic), Sample 4 (malic), Sample 6 (succinic), Sample 7 (adipic), Sample 8 (citric) and Sample 9 (oxalic) all performed well as acid scrubbers. Table 3 shows capacities for scrubbing dilute HCl in argon.

TABLE 3

Dilute HCl Scrubbing

| Sample | Flow Rate (bed vol/min) | Bulk Density (g/ml) | Test Gas Dilution | HCl Consumed (moles/l bed) |
|---|---|---|---|---|
| Sample 3 | 4 | 0.61 | HCl/17% | 5.2 |
| Sample 4 | 6.7 | 0.75 | HCl/8% | 6.6 |
| Sample 6 | 8 | 0.67 | HCl/8% | 3.3 |
| Sample 7 | 8 | 0.96 | HCl/8% | 8.3 |
| Sample 8 | 8 | 0.80 | HCl/8% | 8.1 |
| Sample 9 | 8 | 0.88 | HCl/8% | 2.9 |

Example 5. Boron Techloride Scrubbing

The various samples prepared in Example 1 were compared with commercial goethite and the zinc oxide/alumina scrubbers for effectiveness in scrubbing boron trichloride diluted in argon.

TABLE 4

BCl$_3$ Scrubbing

| Sample | Flow Rate (bed vol/min) | Bulk Density (g/ml) | Test Gas Dilution | BCl$_3$ Consumed (moles/l bed) |
|---|---|---|---|---|
| Sample 10 | 3 | 0.59 | BCl$_3$/19% | 1.4 |
| Sample 11 | 1 | 0.76 | BCl$_3$/50% | 1.35 |
| Sample 8 | 10 | 0.8 | BCl$_3$/1% | 1.0 |
| Sample 13 | 20 | 0.66 | BCl$_3$/1% | 1.8 |
| FeO(OH)[1] | 0.56[2] | 0.69 | BCl$_3$/6.5% | 1.3[3] |
| ZnO/Al$_2$O$_3$[4] | 0.76 | 0.99 | BCl$_3$/1% | 0.3 |

[1] Goethite form, sold as a commercial acid gas scrubber
[2] Fastest rate at which bed could be tested without unacceptable level (0.6 ppm) of hazardous gas passing through bed unabated.
[3] Inlet pressure of test vessel began to rise near the conclusion of the test. Heavy deposits of borates were observed in the outlet screen of the reactor following the conclusion of the test. This did not occur with the other samples.
[4] A commercially available ZnO/Al$_2$O$_3$ catalyst composition.

The samples prepared according to the present invention performed at least as well as the commercial materials in reaction with boron trichloride and used about three-quarters of the acid-reactive moieties. By contrast, the goethite sample used only about half of the theoretically available acid scrubbing sites contained in the mass of the material. When exhausted and exposed to air, the goethite sample evolved copious amounts of HCl (>40 ppm) over a period of several days, while the samples prepared according to the present invention evolved less than 2 ppm over a period of only a few hours. Likewise, when exhausted and exposed to air, the $ZnO/Al_2O_3$ sample evolved moderate amounts of HCl (4–5 ppm) over a 24 hour period.

Example 6. Chlorine Scrubbing

The ability to scrub halogens can be imparted through the inclusion of sulfite ($SO_3$) moieties in the structure of the scavengers prepared according to the present invention. Reactivity toward $Cl_2$ was demonstrated using tests similar to those carried out for HCl and $BCl_3$. The conditions and results of scrubbing tests for chlorine diluted in argon are summarized in Table 5. Sample 11 was an iron carbonate-malate-silicate-sulfite materials, whereas Sample 2 was an iron carbonate-silicate scavenger material and Sample 3 was an iron carbonate-malonate-silicate material. Neither Sample 2 nor Sample 3 contained incorporated sulfite.

TABLE 5

Chlorine Scrubbing

| Sample | Flow Rate (bed vol/min) | Bulk Density (g/ml) | Test Gas Dilution | $Cl_2$ Consumed (moles/l bed) |
|---|---|---|---|---|
| Sample 11 | 10 | 0.76 | $Cl_2$ = 8% | 1.75 |
|  | 3 |  | $Cl_2$ = 20% | 3.4 |
| Sample 2 | 1 | 0.76 | $Cl_2$ = 100% | none |
| Sample 3 | 7 | 0.61 | $Cl_2$ = 30% | none |
|  | 4 |  | $Cl_2$ = 25% | none |
|  | 2 |  | $Cl_2$ = 50% | none |
| $Fe(C_2O_4)$[1] | 15 | 0.79 | $Cl_2$ = 4% | none |
|  | 6 |  | $Cl_2$ = 9% | none |
|  |  |  | $Cl_2$ = 100% | none |
| FeO(OH)[2] | 12 | 0.69 | $Cl_2/5.0\%$ | 0.04[3] |
|  | 5.6 |  | $Cl_2/10.7\%$ | 0.09[3] |
|  | 1.7 |  | $Cl_2/100\%$ | 0.20[3] |

[1]) Iron oxalate ACS Reagent Grade, fine powder used as received.
[2]) Goethite form, sold as a commercial acid gas scrubber.
[3]) In all the $Cl_2$ goethite tests, high flow rates of bias gas were mixed with the scrubber outlet to dilute outlet stream by a factor of 10.

Sample 11 is superior to some other materials sold commercially for chlorine scrubbing. In the scavengers prepared according to the present invention, the reactive metal center ($Fe^{+2}$ in this example) is in an environment which enhances its reactivity with chlorine. By contrast, iron oxalate, in which the iron center is also present in the ferrous form, is worthless for chlorine scrubbing.

It should be noted that in the tests of the commercial goethite, it was necessary to dilute the outlet of the reactor by a factor of ten with an auxiliary inert gas stream. If this was not done, outlet chlorine concentrations of greater than 0.5 ppm ($Cl_2$ TLV value) were observed at the beginning of the test. Because the goethite did not abate $Cl_2$ streams to levels below TLV, its value as a chlorine scrubber is low. However, this test was used as a benchmark in that goethite does interact with $Cl_2$ in some manner to remove substantial amounts of it from a gas stream, and at some point of exposure its capacity to scrub even to a limited extent is exhausted.

Example 7. Sequential Scrubbing of HCl and $Cl_2$

Sample 12 scavenger was tested for scrubbing chlorine diluted in argon. At all concentrations of chlorine above 0.05 ppm, chlorine was detected in the effluent stream by the MDA detector (detection limit 0.05 ppm). Fresh Sample 12 scavenger was allowed to react with an 8% stream of HCl in argon to exhaustion (4.8 moles/1) at 7.5 bed volumes/minute of test gas flow. The spent sample was purged free of residual HCl with inert gas and then allowed to react with $Cl_2$. The chlorine reaction was carried out with an 8% $Cl_2$ in argon stream passing through the sample at 7.5 bed volumes/minute. Sample 12 scrubbed 0.56 moles of chlorine/liter of scrubber bed volume under these conditions. When the total reactive gas flow was reduced to 3 bed volumes/minute, Sample 12 had a $Cl_2$ capacity of 1.0 moles/liter of scrubber bed. The number of chlorine scrubbing sites generated by the HCl treatment was calculated, with the assumption that the scavenger scrubs by the following processes, where L is the oxomeric ligand:

$$2HCl+Fe+^2(L^-)_2 \rightarrow 2\ HL+FeCl_2Cl_2+2FeCl_2 \rightarrow 2FeCl_3$$

The chlorine scrubbing experiment at the lower flow rate showed that the chlorine capacity was 83% of theoretical. Clearly this scavenger material is useful for scrubbing mixtures of $Cl_2$ and HCl such as are found in etch reactor effluent gas streams.

Example 8. Infrared Characterization of Scavengers

The FIGURE compares the infrared absorption spectra of some well-characterized copper complexes with three variations of the present invention. The copper complexes were chosen for comparison because they contain a transition metal center of the same valency and approximate size as $Fe^{2+}$ and have well characterized structures in which the oxomeric moieties bridge two transition metal centers. Iron complexes whose structures had been well-characterized were not available.

Trace A shows the IR absorption spectrum of a commercial sample of copper carbonate, which is included for the purpose of comparison because it is a well-characterized transition metal carbonate that is known to have a bridging structure. Trace B shows the IR absorption spectrum of a commercial sample of copper citrate. Trace C shows the IR absorption spectrum of iron carbonate prepared by the method of the present invention (Example 1, Sample 1). Trace D shows an iron carbonate-malate-silicate scavenger prepared as described for Sample 13, and Trace E shows an iron carbonate-citrate-silicate scavenger prepared as described for Sample 8. The samples were prepared as KBr disks and examined on a Perkin-Elmer Series 1600 FTIR.

Symmetric and asymmetric stretches in an uncomplexed carbonate moiety appear at 1432, 1087, 874, and 706 $cm^{-1}$. A metal-complexed carboxylate should have three bands, one appearing in the 1700–1400 $cm^{-1}$ region, and two appearing in the 1400–900 $cm^{-1}$ region. The copper carbonate spectrum (A), although complicated by the presence of (Cu-OH) moieties, has major features at 1514 and 1398, 1100 and 1052, 883 and 820, and 753 $cm^{-1}$, consistent with a carbonate moiety bridging two metal centers in a material where the metals do not all have the same environment. The broad feature centered about 3400 $cm^{-1}$ is typical for hydrated transition metal oxides or hydroxides.

The spectra of the copper (A) and iron (C) carbonates show many similarities, with the iron carbonate sample having features at 1504, 1386, 1075, and 864 $cm^{-1}$. The broadness of the carbonate stretches (features centered at 1386 and 1504 $cm^{-1}$) is consistent with a large, disordered molecule such as an irregular or non-crystalline polymer. The feature centered at 3417 $cm^{-1}$ is consistent with a hydrated metal oxide.

The spectrum of the sample of iron carbonate malate silicate (D) also has much in common with the copper and iron carbonate spectra, having broad features at 1485, 1390, 1027, and 862 $cm^{-1}$, again consistent with a large molecule containing bridging carbonate groups. The appearance of a feature at 1623 $cm^{-1}$ is consistent with the introduction of carboxylate moieties into the structure, as comparison with the copper citrate spectrum (B) reveals. The change in intensity and shape of the feature centered about 3428 cm$^{-1}$ is consistent with the introduction of silicate into the structure.

The spectrum of the iron carbonate citrate silicate sample (E) contains information consistent with bridging carbonate moieties, having broad features centered at 1419, 1012, and 862 cm$^{-1}$. In addition, like the iron carbonate malate silicate and copper citrate spectra, this spectrum contains a feature consistent with a carboxylate moiety at 1636 cm$^{-1}$. The change in shape of the feature centered about 3444 cm$^{-1}$ compared with the iron carbonate malate silicate sample (D) is due to the incorporation of citrate in this material. Substitution of citrate for malate results in the inclusion of a longer and more highly branched carbon chain containing substituents capable of interacting coordinatively with metal centers within the structure.

To summarize, the infrared spectra of the scavengers prepared by the methods of the present invention are consistent with an extended structure incorporating bridging carbonate ligands and carboxylate and silicate functionalities, as described in the specification above.

Example 9. Elemental Analyses of BCl$_3$ Scrubber

Sample 13 scavenger was exposed to BCl$_3$ in a capacity experiment until it was exhausted. Portions of fresh material and exhausted material were submitted for elemental analysis. The results appear in Table 6 below.

TABLE 6

Elemental Analysis of Sample 13 Before and After Exposure to BCl$_3$

| Sample 13 | Fe | Si | B | C | Cl | H | O |
|---|---|---|---|---|---|---|---|
| Fresh | | | | | | | |
| Weight Percent | 26.4 | 7.6 | trace | 6.8 | 1.4 | 2.41 | — |
| Mole Ratio (Fe = 1) | 1.0 | 0.57 | 0.0 | 1.2 | 0.08 | 5.0 | 7.2 |
| Spent | | | | | | | |
| Weight Percent | 23.5 | 6.2 | 3 | 2.75 | 26.8 | 1.59 | — |
| Mole Ratio (Fe = 1) | 1.0 | 0.52 | 0.67 | 0.54 | 1.8 | 3.8 | 5.4 |

These data show that after scrubbing boron trichloride, boron is retained in the scrubber in a molar ratio of 2B: 3Fe. Over half the carbon has been lost, probably by conversion of carbonate to CO$_2$ upon exposure to the acidic gas. Oxygen and hydrogen have also been lost, corresponding to loss of CO$_2$ and H$_2$O.

While the invention has been described herein with reference to specific aspects, features, and embodiments, it will be apparent that other variations, modifications, and embodiments are possible, and all such variations, modifications, and embodiments therefore are to be regarded as being within the spirit and scope of the invention.

What is claimed is:

1. A metallic macromer, having utility for gas contacting to remove acidic or corrosive gaseous components therefrom, comprising a coordinated complex of (i) metal coordination atoms M, each of which is covalently linked to (ii) at least two chains of oxygen-containing groups, wherein each of the chains contains at least one oxygen-containing unit and each oxygen-containing unit is independently selected from the group consisting of carbonate (—O—C(O)—O—), sulfite (—O—S(O)—O), carboxylate (—O—C(O)—), and silicate (—O—Si(O)$_2$—O), wherein oxygen-containing units that are present as successive units in a chain are optionally interconnected by a divalent organo group therebetween, wherein the metal coordination atoms M are covalently linked to each of said at least two chains of oxygen-containing units through an oxo moiety (—O—) of an oxygen-containing unit in each said chain, wherein the metallic macromer comprises at least two differing types of said oxygen-containing units, and wherein the metal of the metal coordination atoms M is selected from the group consisting of Group IB, IIB, IVB, VIB, VIIB, and VIIIB metals of the Periodic Table, with the proviso that when the metal atom M is iron, M is Fe$^{+2}$; wherein said metallic macromer is characterized by at least one of the characteristics of:

(a) all of the metal atoms being the same; and (b) at least one of the oxygen-containing units including a carboxylate (—O—C(O)—) unit.

2. A metallic macromer according to claim 1, whose infrared spectrum comprises an absorption peak centered in the range of 3410 to 3450 cm$^{-1}$.

3. A metallic macromer according to claim 1, wherein the metal of the metal coordination atoms M is selected from one or more of the group consisting of iron, chromium, manganese, cobalt, nickel, copper, rhodium, ruthenium, and iridium.

4. A metallic macromer according to claim 1, wherein the metal of the metal coordination atoms M possesses two stable oxidation states.

5. A metallic macromer according to claim 1, whose infrared spectrum comprises a carbonate peak at a wavelength of from 1300 to 1500 cm$^{-1}$.

6. A metallic macromer according to claim 1, wherein at least one of said oxygen-containing units includes a carboxylate (—O—C(O)—) unit.

7. A metallic macromer according to claim 1, of substantially neutral pH character.

8. A metallic macromer according to claim 1, wherein the metal of the metal coordination atoms M is capable of forming a stable metal carbonate which is decomposable upon reaction with acid gas.

9. A metallic macromer according to claim 1, wherein the coordinated complex further comprises a silica binder.

10. A metallic macromer according to claim 1, wherein the macromer is present in a particulate form comprising extrudate pellets 1–5 mm in diameter and 0.2-2 cm in length.

11. A metallic macromer according to claim 1, wherein the oxygen-containing units are carbonate (—O—C(O)—O—) and carboxylate (—O—C(O)—).

12. A metallic macromer according to claim 1, wherein carboxylate (—O—C(O)—) groups comprise from 20 mole percent to 60 mole percent of said oxygen-containing groups.

13. A metallic macromer according to claim 1, wherein the covalently bonded complex comprises from 2 to 10,000 of said oxygen-containing units in each of the chains of oxygen-containing units covalently linked to each of the metal coordination atoms.

14. A metallic macromer according to claim 1, wherein M is iron, and said chains of oxygen-containing groups include oxygen-containing units selected from the group consisting of carbonate, carboxylate, and sulfite, such that the mole ratio of iron/carbonate/carboxylate/sulfite is in the range of about 1/0.5–0.98/0.02–0.5/0–0.6.

15. A metallic macromer according to claim 1, wherein M is iron, and said chains include oxygen-containing units selected from the group consisting of carbonate, carboxylate, and sulfite, such that the mole ratio of iron/carbonate/carboxylate/sulfite is in the range of about 1/0.2–0.5/0.2–0.5/0.2–0.6.

16. A metallic macromer according to claim 1, wherein M is iron, and said chains include oxygen-containing units selected from the group consisting of carbonate, carboxylate, and sulfite, such that the mole ratio of iron/ carbonate/carboxylate is in the range of about 1/0.25–0.75/ 0.25–0.75.

17. The metallic macromer of claim 1 wherein the metallic macromer comprises at least three differing types of said oxygen-containing units.

18. The metallic macromer of claim 1 wherein all of the metal atoms M are iron present in the +2 oxidation state.

19. A metallic macromer according to claim 18, wherein said coordinated complex contains chains of oxygen-containing units wherein the oxygen-containing units are selected from carbonate, carboxylate, and sulfite, such that the mole ratio of iron/carbonate/carboxylate/sulfite is in the range of about 1/0.5–0.98/0.02–0.5/0–0.6.

20. A metallic macromer, having utility for gas contacting to remove impurities therefrom, and consisting essentially of a coordinated complex of (i) metal coordination atoms M, each of which is covalently linked to (ii) at least two chains of oxygen-containing units, wherein each of the chains contains oxygen-containing units independently selected from the group consisting of carbonate (—O—C(O)—O—), sulfite (—O—S(O)—O), carboxylate (—O—C(O)—), and silicate (—O—Si(O)$_2$—O), wherein oxygen-containing units that are present as successive units in a chain are optionally interconnected by a divalent organo group therebetween, wherein the metal coordination atoms M are covalently linked to each of said at least two chains of oxygen-containing units through an oxo moiety (—O—) of an oxygen-containing unit in each said chain, and wherein the metallic macromer comprises at least two differing types of said oxygen-containing units, and wherein the metal of the metal coordination atoms M is selected from the group consisting of Group IB, IIB, IVB, VIB, VIIB, and VIIIB metals of the Periodic Table with the provisos that all of the metal atoms are the same and that, when the metal atom M is iron, M is Fe$^{+2}$.

21. The metallic macromer of claim 20 wherein the metallic macromer comprises at least three differing types of said oxygen-containing units.

22. A three-dimensional polymeric metal coordination complex comprising metal coordination atoms M selected from the group of metals of Periodic Table Groups IB, IIB, IVB, VIIB, and VIIIB, wherein each metal coordination atom M is coordinated to at least two chains comprising oxygen-containing units independently selected from the group consisting of:

—O—C(O)—O—

—O—C(O)—

—O—S(O)—O—, and

—O—Si(O)$_2$—O—, said complex optionally including a divalent organo between successive oxygen-containing groups in the chains of said groups, and wherein each said metal coordination atom M is covalently linked to said chains of oxygen-containing groups by an oxo (—O—) moiety of an oxygen-containing group in each said chain, and wherein the metallic macromer comprises at least two differing types of said oxygen-containing groups therein, with the proviso that when the metal atom M is iron, M is Fe$^{+2}$; wherein said three-dimensional polymeric metal coordination complex is characterized by:

(a) all of the metal atoms being the same; and (b) at least one of the oxygen-containing units including a carboxylate (—O—C(O)—) unit.

23. A three-dimensional polymeric metal coordination complex according to claim 22, wherein the metal coordination atoms M are selected from the group of metals consisting of iron, chromium, manganese, cobalt, nickel, copper, rhodium, ruthenium, and iridium.

24. A three-dimensional polymeric metal coordination complex according to claim 22, and comprising at least one of carbonate and sulfite oxygen-containing groups, whereby the complex is ablative in the presence of said acidic and/or corrosive gases, by reaction of carbonate (—O—C(O)—O—) groups with said acidic and/or corrosive gases to produce CO$_2$ when carbonate groups are present, and by reaction of sulfite (—O—S(O)—O—) groups with said acidic and/or corrosive gases to produce SO$_2$ when sulfite groups are present, to thereby increase the surface area of the complex for scrubbing of said acidic and/or corrosive gases in use of the complex therefor.

25. A three-dimensional polymeric metal coordination complex according to claim 24, wherein said acidic and/or corrosive gases to which said polymeric moieties are depolymerizingly reactive, comprise a gas component selected from the group consisting of mineral acids, hydrolyzable inorganic compounds, and halogens.

26. A three-dimensional polymeric metal coordination complex according to claim 25, wherein said hydrolyzable inorganic compound is a hydrolyzable metal halide.

27. A metal-containing macromer, having utility for gas contacting to remove acidic or corrosive gaseous components therefrom, comprising a coordinated complex of (i) metal coordination atoms, each of which is covalently linked to (ii) at least three different oxomeric moieties, each oxomeric moiety including repeating units selected from the group consisting of carbonate, sulfite, carboxylate, and silicate, and combinations thereof, and wherein sufficient oxomeric moieties are linked to each metal coordination atom to satisfy its valency requirements, wherein said macromer is characterized by all of the metal atoms being the same, and wherein each metal coordination atom is covalently linked to all three oxomeric moieties in either of the following combinations: (1) a mixture of carbonate, sulfite, and carboxylate units, or (2) a mixture of carbonate sulfite, and silicate units.

28. A metallic macromer according to claim 27, wherein the repeating units in said macromer comprise a mixture of carbonate, sulfite, and carboxylate units.

29. A metallic macromer according to claim 27, wherein the repeating units in said macromer comprise a mixture of carbonate, sulfite, and silicate units.

* * * * *

UNITED STATES PATENT AND TRADEMARK OFFICE
CERTIFICATE OF CORRECTION

PATENT NO. : 5,777,058
DATED : July 7, 1998
INVENTOR(S) : Fischer.

It is certified that error appears in the above-indentified patent and that said Letters Patent is hereby corrected as shown below:

Column 13, Line 62    change "Na2O" to -- $Na_2O$ --.
Column 19, Line 21    change "by-broduct" to -- by-product --.
Column 22, Line 11    change the chemical reactions to read as follows in two separate lines:

$$2HCl + Fe^{+2}(L^-)_2 \rightarrow 2\ HL + FeCl_2$$
$$Cl_2 + 2FeCl_2 \rightarrow 2FeCl_3$$

Signed and Sealed this

Fifteenth Day of December, 1998

Attest:

BRUCE LEHMAN

*Attesting Officer*    Commissioner of Patents and Trademarks